United States Patent
Murray et al.

(10) Patent No.: US 9,891,629 B2
(45) Date of Patent: Feb. 13, 2018

(54) AUTONOMOUS ROBOTIC AGRICULTURAL MACHINE AND SYSTEM THEREOF

(71) Applicant: DEERE & COMPANY, Moline, IL (US)

(72) Inventors: Cole L. Murray, Polk City, IA (US); Mark E. Barker, Johnston, IA (US)

(73) Assignee: Deere & Company, Moline, IL (US)

( * ) Notice: Subject to any disclaimer, the term of this patent is extended or adjusted under 35 U.S.C. 154(b) by 17 days.

(21) Appl. No.: 15/015,265

(22) Filed: Feb. 4, 2016

(65) Prior Publication Data
US 2017/0227969 A1   Aug. 10, 2017

(51) Int. Cl.
| | |
|---|---|
| G05D 1/02 | (2006.01) |
| A01C 14/00 | (2006.01) |
| A01C 21/00 | (2006.01) |
| A01B 79/00 | (2006.01) |
| A01D 91/00 | (2006.01) |
| B60K 6/20 | (2007.10) |
| B62D 49/06 | (2006.01) |
| A01B 51/02 | (2006.01) |
| A01B 59/06 | (2006.01) |
| A01D 34/00 | (2006.01) |

(52) U.S. Cl.
CPC ......... *G05D 1/0276* (2013.01); *A01B 51/023* (2013.01); *A01B 51/026* (2013.01); *A01B 59/06* (2013.01); *A01B 79/00* (2013.01); *A01C 14/00* (2013.01); *A01C 21/00* (2013.01); *A01D 34/008* (2013.01); *A01D 91/00* (2013.01); *B60K 6/20* (2013.01); *B62D 49/0678* (2013.01); *G05D 1/0278* (2013.01)

(58) Field of Classification Search
CPC ...... A01B 51/00; G05D 1/021; G05D 1/0276; G05D 1/0278
USPC .......................................................... 701/50
See application file for complete search history.

(56) References Cited

U.S. PATENT DOCUMENTS

| | | |
|---|---|---|
| 3,971,446 A | 7/1976 | Nienberg |
| 4,612,996 A | 9/1986 | Wolf et al. |
| 5,092,422 A | 3/1992 | Hood, Jr. et al. |
| 2008/0046130 A1 | 2/2008 | Faivre et al. |
| 2009/0200051 A1 | 8/2009 | Tarasinski et al. |
| 2010/0106344 A1 | 4/2010 | Edwards et al. |
| 2015/0105965 A1* | 4/2015 | Blackwell ............ A01B 59/002 701/28 |

FOREIGN PATENT DOCUMENTS

WO     14147208 A1     9/2014

* cited by examiner

*Primary Examiner* — Redhwan K Mawari
*Assistant Examiner* — Anshul Sood
(74) *Attorney, Agent, or Firm* — Taft Stettinius & Hollister LLP; Stephen F. Rost

(57) ABSTRACT

An autonomously robotic machine for performing one or more agricultural operations. The machine includes a frame having a length and an adjustable width. A plurality of ground-engaging mechanisms are coupled to the frame for propelling the machine in a direction of travel. The machine includes a controller, a power-generating device, and a generator. The controller controls the machine, and the generator receives mechanical power from the power-generating device and produces electrical power. A docking assembly is coupled to the frame. The docking assembly includes a power unit and at least one coupler for coupling to any one of a plurality of agricultural implements.

18 Claims, 12 Drawing Sheets

AUTONOMOUS ROBOTIC AGRICULTURAL MACHINE AND SYSTEM THEREOF

FIELD OF THE DISCLOSURE

The present disclosure relates to a robotic machine, and in particular an autonomous robotic machine and system capable of performing a plurality of agricultural-related operations.

BACKGROUND OF THE DISCLOSURE

Technology continues to evolve in most industries around the world, and the agricultural and farming industries are no exception. For large scale farming, machinery continues to get larger with significantly higher costs associated therewith, including but not limited to labor and maintenance costs. Other factors such as pesticide prices and pesticide resistance, emissions, and compaction continue to affect overall farming costs. Increasing the size of equipment and implements may no longer affect the bottom-line of consumers, and thus other solutions are needed.

SUMMARY

In one embodiment of the present disclosure, an autonomously robotic machine for performing one or more agricultural operations. The machine includes a frame having a length and an adjustable width; a plurality of ground-engaging mechanisms coupled to the frame for propelling the machine in a direction of travel; a controller for controlling the machine; a power-generating device mounted to the frame for producing mechanical power, a generator coupled to the power-generating device, where the generator receives at least a portion of the mechanical power and produces electrical power; and a docking assembly coupled to the frame, the docking assembly including a power unit and at least one coupler configured to couple to any one of a plurality of agricultural implements; wherein the power unit is coupled to the generator and is configured to electrically power one of the plurality of agricultural implements when coupled to the docking assembly.

In one example of the present embodiment, a position sensor is coupled to the frame and disposed in electrical communication with the controller, the position sensor detecting a width of the frame; and an actuator is electrically coupled to the generator and the controller; wherein, the controller operably controls the actuator for adjusting the width. In a second example, a position sensor is coupled to the frame and disposed in electrical communication with the controller, the position sensor detecting a height of the frame; and an actuator is electrically coupled to the generator and the controller; wherein, the controller operably controls the actuator for adjusting the height of the frame between a lowered position and a raised position. In a third example, the power-generating device may be a diesel-electric or natural gas-electric unit. In a fourth example, the machine may include a motor electrically coupled to the generator, wherein the motor receives electrical power from the generator for driving at least one of the plurality of ground-engaging mechanisms.

In a fifth example, the machine may include a sensor disposed in electrical communication with the controller, the sensor configured to provide visual feedback to the controller of an area around or under the frame. In a sixth example, the machine may include a global positioning sensor disposed in electrical communication with the controller; and a speed sensor disposed in electrical communication with the controller; wherein, the global positioning sensor is configured to provide a location of the machine and the speed sensor is configured to provide a speed of at least one of the plurality of ground-engaging mechanisms to the controller. In another example, an implement-receiving area is defined at least partially below the frame, where the implement-receiving area is configured to receive one of the plurality of agricultural implements when coupled to the docking assembly. In yet another example, the at least one coupler of the docking assembly includes an implement docking locking mechanism and an electrical or hydraulic connecting mechanism. In a further example, the docking assembly is operably coupleable to any one of a planting implement, a tillage implement, a harvesting implement, and a spraying implement.

In another embodiment of the present disclosure, an agricultural system for performing an agricultural operation includes an autonomous robotic machine including a frame, a plurality of ground-engaging mechanisms coupled to the frame, a controller, a power-generating device mounted to the frame for producing mechanical power, a generator coupled to the power-generating device, and a docking assembly coupled to the frame, wherein the docking assembly includes a power unit and at least one coupler; a control unit located remotely from the machine, the control unit being in electrical communication with the controller to communicate an instruction thereto; a docking station for coupling to the docking assembly, the docking station configured to store one or more of fuel, water, and electrical power; and a plurality of sensors positioned on the machine, wherein each of the plurality of sensors is electrically coupled to the controller, wherein the controller receives the instruction from the control unit, and the controller operably controls the machine based on the instruction.

In one example of this embodiment, the system may include a position sensor coupled to the frame and disposed in electrical communication with the controller, the position sensor detecting a height or width of the frame; and an actuator electrically coupled to the generator and the controller; wherein, the controller operably controls the actuator for adjusting the height or width of the frame. In a second example, the control unit may include a memory unit for storing a map of a work area, a list of agricultural operations, and operating instructions; further wherein, the control unit communicates a command to the controller to autonomously couple the docking assembly to one of a plurality of agricultural implements, move to a location in the work area, and execute operating instructions to perform an agricultural operation. In a third example, the one of the plurality of agricultural implements includes a tillage implement, a planting implement, a harvesting implement, or a spraying implement. In another example, one of the plurality of sensors may include a positioning sensor for detecting when the agricultural implement is coupled to the docking assembly, the positioning sensor communicating with the controller when the docking assembly is coupled to the agricultural implement. In yet another example, the control unit may include a mobile device.

In another embodiment of the present disclosure, a method of controlling an autonomously robotic machine to perform an agricultural operation includes providing an autonomous robotic machine including a frame, a plurality of ground-engaging mechanisms, a controller, a power-generating device for producing mechanical power, a generator coupled to the power-generating device and producing electrical power, and a docking assembly coupled to the frame, the docking assembly including a power unit; receiving an instruction from a control unit located remotely from the machine, the instruction commanding the controller to perform an agricultural operation with one of a plurality of agricultural implements at a location in a work area; executing the instruction to maneuver the machine to an implement storage area so that the docking assembly is in position at least partially above the one agricultural implement identified in the instruction; controlling a width and height of the frame based on the instruction; coupling the docking assembly to the one agricultural implement; adjusting the height of the frame to a transport position; operably controlling the machine to move to the location in the work area; adjusting the height of the frame to a work position based on the instruction; and performing the agricultural operation with the one agricultural implement in the work area.

In one example of this embodiment, the method may include controlling the machine to return the one agricultural implement to the implement storage area; and releasing the one agricultural implement from the docking assembly. In another example, the method may include controlling the power unit to provide electrical power to the one agricultural implement to perform the agricultural operation. In a further example, the method may include receiving a second instruction from a position sensor related to the height or width of the machine; and controlling an actuator to adjust the height or width of the frame to an appropriate height or width based on the instruction.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Technology continues to evolve in the agriculture industry, and with it comes new and improved ways of farming. In some of these advancements, changes are being made to the manner in which agricultural machinery is being manufactured and operated. Labor shortages, product costs, emissions, etc. continue to drive technology in this industry, and with this comes a renewed focus on reinventing the equipment and how it works.

In this disclosure, one or more embodiments will be described that relate to an autonomous, robotic work machine that is capable of performing a plurality of farming operations, i.e., harvesting (grain, cotton, sugar), planting, seeding, spraying (nutrient and pesticide application), tillage (primary, secondary, weed mitigation), strip till, etc. An autonomous robot or robotic work machine is a machine that is capable of performing desired tasks in unstructured or structured environments with minimal human guidance. In some embodiments, there may be little to no human involvement with respect to the operation of the autonomous robotic work machine. The degree of autonomy can be structured various ways and may be something that is customizable to an end user. Alternatively, a control unit or command center may be able to communicate instructions to the machine, as will be described further in this disclosure.

Figure 1:
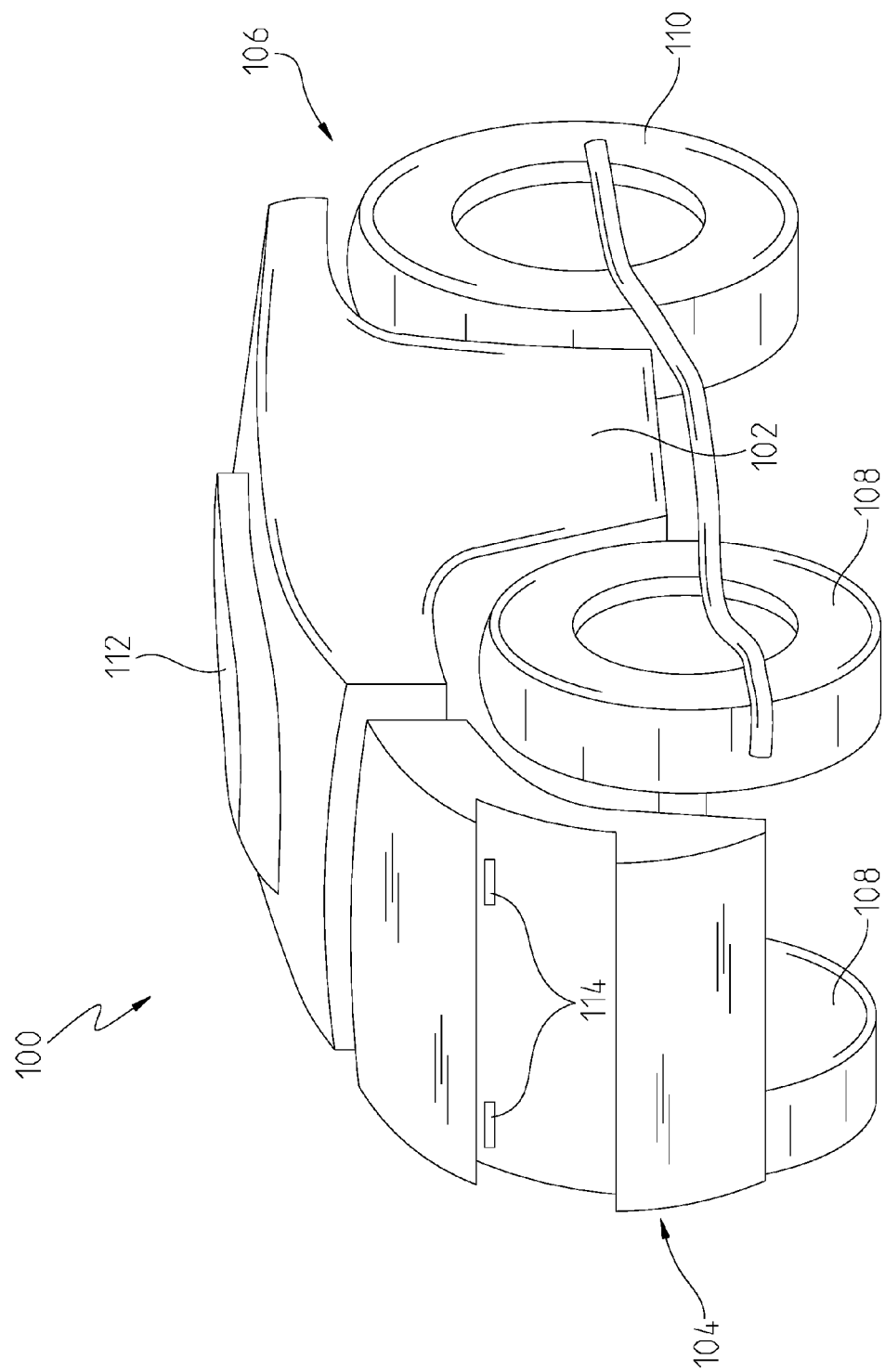
FIG. 1 is an elevated perspective view of an autonomous robotic farming machine.

Referring to FIG. 1, an embodiment of an autonomous robotic work machine 100 is illustrated. The machine 100 includes a frame or chassis 102, a front end 104, and a rear end 106. Ground-engaging mechanisms may be coupled to the frame 102 for propelling the machine 100 along a ground surface. The ground-engaging mechanism may include a pair of front wheels or tires 108 and a pair of rear wheels or tires 110. In other embodiments, however, the ground-engaging mechanism may include tracks. The machine 100 may include a control unit or control system 112 for controlling the operation of the machine. As will be described, the control system 112 may receive and transmit signals to a remote control unit or command center. This will be described further with regards to FIG. 2.

At the front end 104 of the machine, headlights 114 or the like may be disposed to allow the machine to operate at night. Rather than headlights, these may include sensors such as proximity or position sensors. In another embodiment, a camera or object-detection mechanism may be disposed at the front end 104 of the machine 100. These and other alternative will be further described below.

The robotic work machine 100 is designed such that it can perform one or more basic farming operations (harvesting, planting, spraying, and tillage). It may also be designed to perform other operations besides basic farming operations. Depending upon the task, a particular tool or implement may be designed for docking or coupling to the machine 100. The docking or coupling function will be further described in this disclosure.

In any event, the machine 100 may autonomously connect and disconnect from any tool. Moreover, a docking station may be provided to which the machine 100 may autonomously connect and disconnect from. The docking station may allow the machine to replenish its fuel and water (e.g., for spraying). In addition, if the machine includes a battery-powered system, the docking station may allow the battery-powered station to recharge. This will be described further with regards to FIG. 2.

Tasks or operations may be communicated to the robotic work machine 100 from a control unit or command center. A farmer, for example, may communicate from the control unit or command center an instruction related to a type of task or operation to the work machine. In some instances, more than one autonomous robotic work machine 100 is capable of performing the same or different operations in the same field or work area. Moreover, a work machine 100 may be capable of operating until a task is completed, i.e., twenty-four hours per day, seven days per week.

Task or operation information can be created in a control unit or command center. For example, a command center such as a John Deere® Operations Center may be used for communicating task or operation information to one or more machines. In any event, communications may occur wirelessly over a cellular network, Wi-Fi® network, or any other known wireless communications network. While information is likely communicated wirelessly, other embodiments may incorporate wired communication in addition to wireless communication.

As the robotic work machine 100 is completing a task or operation, it is possible, to monitor the machine and adjust instructions as necessary in real-time. This may be achieved through the wireless communication from the control unit or command center. Alternatively, a farmer or operator may communicate wirelessly from a remote computer or mobile device. A mobile device application may be used for allowing communication and tracking between the mobile device and the machine 100. The mobile device may include a cellular telephone, smartphone, smartwatch, or any other known or to be developed remote communication device.

To complete a task or operation, such as planting, a map of a farmer's field, for example, may be stored electronically in the control unit or command center. The field, or work area, may include defined boundaries and these boundaries may be communicated to the machine 100 from the control unit or command center. As will be described, the robotic work machine 100 may include a global-positioning sensor (GPS) that communicates with the machine controller 112 and the remote control unit or command center. Other sensors may also communicate with each communication device. These sensors include LIDAR (located on each side of the machine) and vision sensors for detecting obstacles, crops, weeds, and surface profile. Other sensors may be used for detecting wind speed and direction for purposes of completing a spraying operation. Drift control sensors may also be on the machine. Position sensors may be used to detect machine height and width, along with tool or implement height or depth (relative to the ground surface). In each instance, these sensors may detect various inputs and communicate these inputs to the machine controller, control unit or command center.

The GPS may include a receiver that monitors machine speed. Each wheel or track may include speed sensors that also detect machine speed. These sensors may also allow the machine controller to compensate or control traction of the ground-engaging mechanisms based on different grades or surface conditions. Radio-frequency identification or vision detection sensors may also be used on the machine to control operation or monitor machine performance. Each of the aforementioned sensors may communicate with the machine controller and the remote control unit or command center. Alternatively, the sensors may only communicate with the machine controller, and the machine controller may communicate directly with the control unit or command center.

Figure 2:
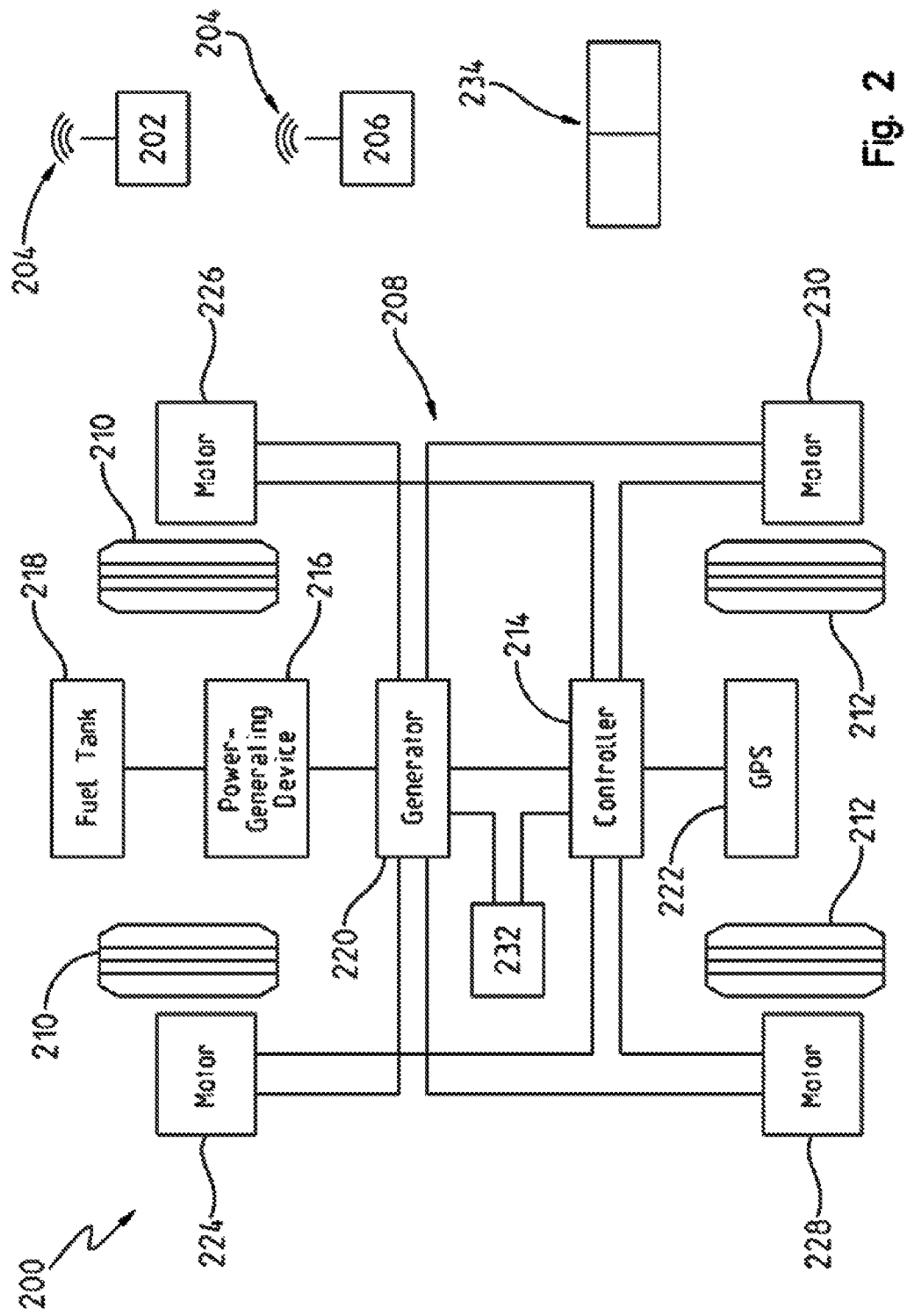
FIG. 2 is a controls schematic of an embodiment of an autonomous robotic farming machine.

In FIG. 2, one embodiment of a control system 200 is illustrated of an autonomous robotic work machine 208. The machine 208 is shown including a pair of front wheels 210 and a pair of rear wheels 212. As previously described, other embodiments may include tracks rather than wheels. In any event, each wheel may be driven by an electric motor. As shown, a first motor 224, a second motor 226, a third motor 228, and a fourth motor 230 are shown for powering each wheel. In machines with additional wheels, there may be a motor for each additional wheel.

The machine 208 may also include a power-generating device 216 such as an engine, motor, etc. In one example, the power-generating device 216 may include a diesel engine. Alternatively, a natural gas engine may be used. In other embodiments, other fuel-driven engines may be used. Moreover, the power-generating device 216 may include a motor or other device for generating mechanical power. In the event the power-generating device 216 functions off a type of a fuel, the machine 208 can include a fuel tank 218.

In one example of this disclosure, the power-generating device 216 is a diesel-electric device. In a further example, the device 216 is a natural gas-electric device. As such, the power-generating device 216 can produce mechanical power that is transferred, at least in part, to a generator 220 for producing electrical power. Although not shown, the machine 208 may include a battery or series of batteries for providing electrical power. The electrical power produced by the generator 220 may be at least partially transferred to each wheel motor 224, 226, 228, 230 to drive the wheels 210, 212. Moreover, the generator 220 can supply electrical power to operate actuators, pumps, sensors, and cameras.

Other components of the machine 208 may receive electrical power from the generator 220 including a controller 214. The controller 214 may control the overall function and operation of the machine 208. The controller 214 may include a memory unit for storing instructions, algorithms, software, look-up tables, and the like for controlling the machine 208. The controller 214 may also include a processor for executing instructions, algorithms, and software for controlling the machine 208. The controller 214 may be in electrical communication with a plurality of sensors located on the machine 208. For example, the controller 214 may be in communication with a global-positioning sensor 222 for detecting location and speed of the machine 208.

As shown in FIG. 2, the machine 208 may include a docking assembly 232 which will be described in further detail below. The docking assembly 232 may include a single power unit for powering tools or implements when coupled to the machine 208. The docking assembly 232 may include connections that allow a plurality of different tools or implements to be coupled to the machine 208, and thus the machine 208 is capable of performing a plurality of agricultural tasks or operations such as harvesting, planting, spraying, tillage, and more.

For docking purposes, a tool area may be arranged to include any number of tools or implements. Each tool or implement may include one or more connections for docking or coupling to the docking assembly 232. In one example, the docking function may be achieved similar to how a laptop computer is able to "dock" to its docking station. When docked, the docking assembly 232 receives electrical power from the generator 220 and in turn transfers electrical power via its power unit to drive or operate the implement. In some instances, there may be additional power units for driving the implement. As such, the machine 208 becomes an autonomous robotic work machine capable of performing multiple agricultural and farming operations without an operator being onboard and in direct control of the machine.

As previously described, the machine 208 may be controlled by a remote control unit. In FIG. 2, for example, a controller or control unit 202 may be located in a remote location and communicate over a wireless network 204 with the machine controller 214. The control unit 202 may further include or be part of a larger command center 206 that communicates over the wireless network 204. The command center 206 may be part of, for example, MyJohnDeere Operations Center which provides tools for customers to manage their machinery. Machine data may be uploaded securely using JDLink™ to share with crop consultants or advisers. The command center 206 may take other forms and the previous example is only one of any number of embodiments that may be incorporated using the teachings of this disclosure.

A consumer may upload a map of one or more fields or work areas to the control unit 202 or command center 206. Field boundaries can be defined from these work areas for communicating to the machine controller 214. Other information such as population seed type, type of operation, and more may be stored by the control unit 202 or command center 206 and communicated to the controller 214. As a result, instructions and functionality of a particular task or operation can be communicated to the machine 208.

As also shown in FIG. 2, a docking station 234 may be provided. The docking station 234 can include storage for fuel, water, any chemical applicant, electrical power, etc. As such, the machine 208 may replenish its fuel tank 218, for example, by docking with the docking station 234. This may occur without operator intervention such that the machine autonomously can refuel and replenish water for a spraying operation or recharge a battery for providing electrical power. The docking station 234 may provide other resources besides those described herein and shown in FIG. 2.

Figure 3:
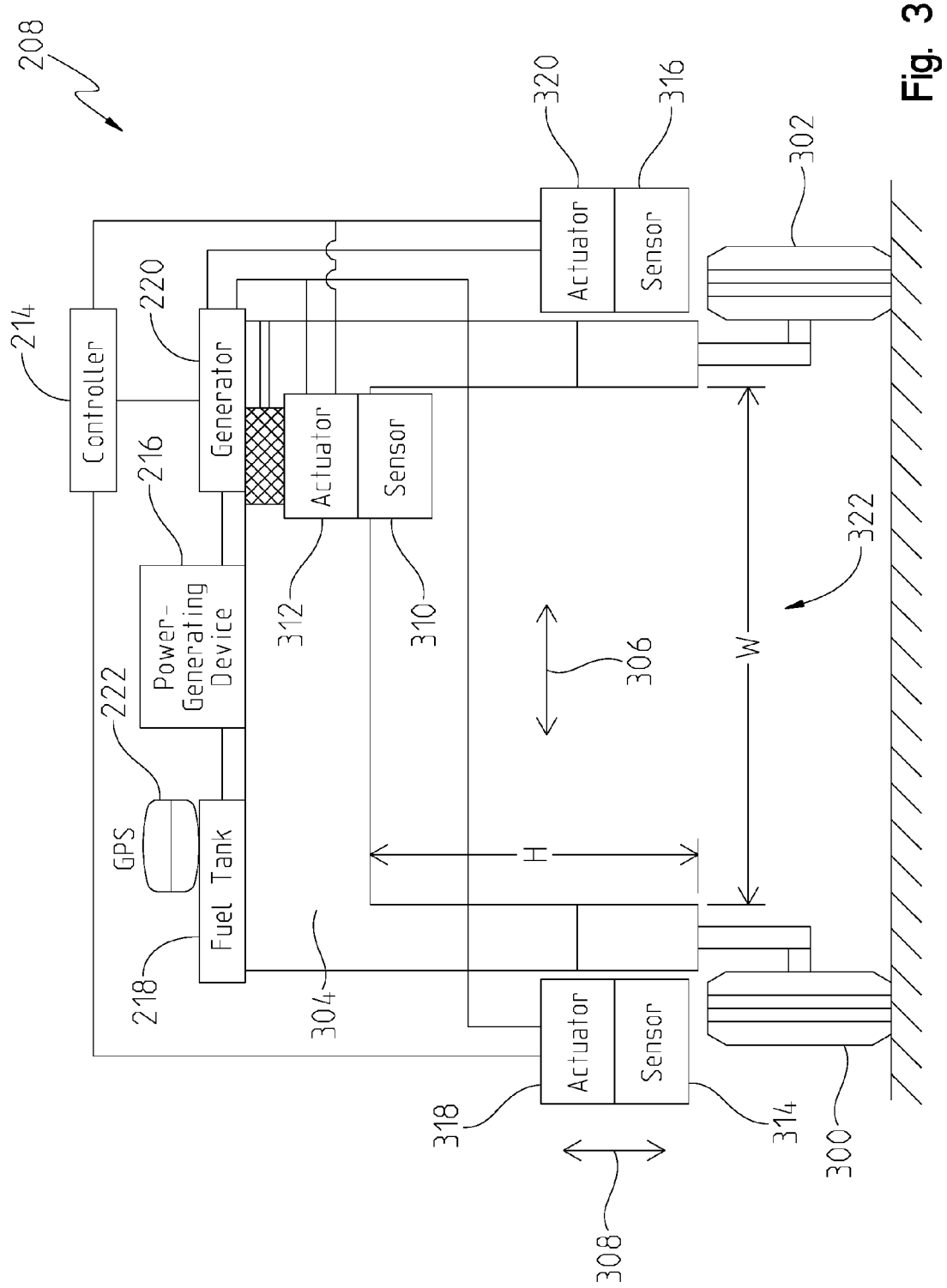
FIG. 3 is a front view of an embodiment of an autonomous robotic farming machine.

Referring to FIG. 3, the autonomous robotic work machine 208 is shown having a number of position sensors and actuators. Each sensor and actuator may be powered via electrical power from the generator 220. Moreover, each sensor and actuator may be in communication with the controller 214. As shown in this view, the machine includes at least a first wheel 300 and a second wheel 302. These wheels may include either pair of front wheels 210 or rear wheels 212 of FIG. 2. Each wheel may be individually and independently powered by a motor, as described above with respect to FIG. 2. Each wheel may include a sensor (not shown) for detecting wheel speed of the respective wheel, and the detected wheel speed may be communicated to the controller 214.

The work machine 208 also includes a frame or chassis 304 that may be adjustable. The machine controller 214 can be programmed to autonomously adjust a frame width or height as necessary for a given function or operation. In FIG. 3, a sensor 310 and actuator are in electrical communication with the controller 214 to adjust a width, W, of the frame 304. The width may be adjusted as indicated by arrow 306 for accommodating different tools or implements for performing a desired agricultural operation. Since certain tools or implements may have a higher draft load, e.g., a deep tillage tool, a narrower tool may be pulled so that torque requirements can be met. Moreover, it may be desirable to adjust the width of the frame when working with different crop sizes or based on different spacing of rows of crop within a work area or field. The sensor 310 can communicate to the controller 214 a current width or position of the frame. In turn, the controller 214 may actuate the actuator 312 to adjust the frame width. As the width is being adjusted, the sensor 310 may intermittently or continuously detect frame position or width and communicate the same to the controller 214. Once the desired width is achieved, the controller 214 can discontinue actuating the actuator 312.

In addition to width, the frame 304 may be adjusted vertically as indicated by arrow 308 to allow the machine 208 to complete operations with taller crops. In other words, a height, H, of the frame 304 may be adjusted. To do so, a first sensor 314 is disposed at or near the first wheel 300 and a second sensor 302 is disposed at or near the second wheel 302. There may be the same number of sensors as wheels depending upon the embodiment. An actuator may also be disposed near each wheel. In FIG. 3, for example, a first actuator 318 and a second actuator 320 are shown. Each actuator and sensor is electrically coupled to the controller 214, and the controller 214 can control actuation of each actuator to adjust the frame height. To do so, each sensor 314, 316 can communicate a position or height of the frame to the controller 214. The controller 214, based on instructions received from the control unit 202 or command center 206, may adjust the frame height by actuating each actuator 318, 320 until the frame height reaches its desired position. As the frame height increases, a tool or implement coupled to the frame may also rise and therefore the distance between the implement and the ground surface. The frame height may also be decreased to allow the machine 208 to perform a deep tillage operation, for example.

Frame height and width can be adjustable by means other than an actuator, i.e., a linear actuator. For example, a ball screw, pneumatic, or electric actuator may be used for adjusting the position of the frame. Other known means may be used as well.

In the embodiment of FIG. 3, the frame 304 is shown as defining an area 322 at least partially beneath the frame 304 for tools or implements to be coupled or docked to the docking assembly 232. As the height or width of the frame is increased, the area 322 may also increase to accommodate different sizes of tools or implements. Likewise, a decrease in height or width may be necessary for accommodating smaller tools or implements. This is further shown in FIG. 4.

Figure 4:
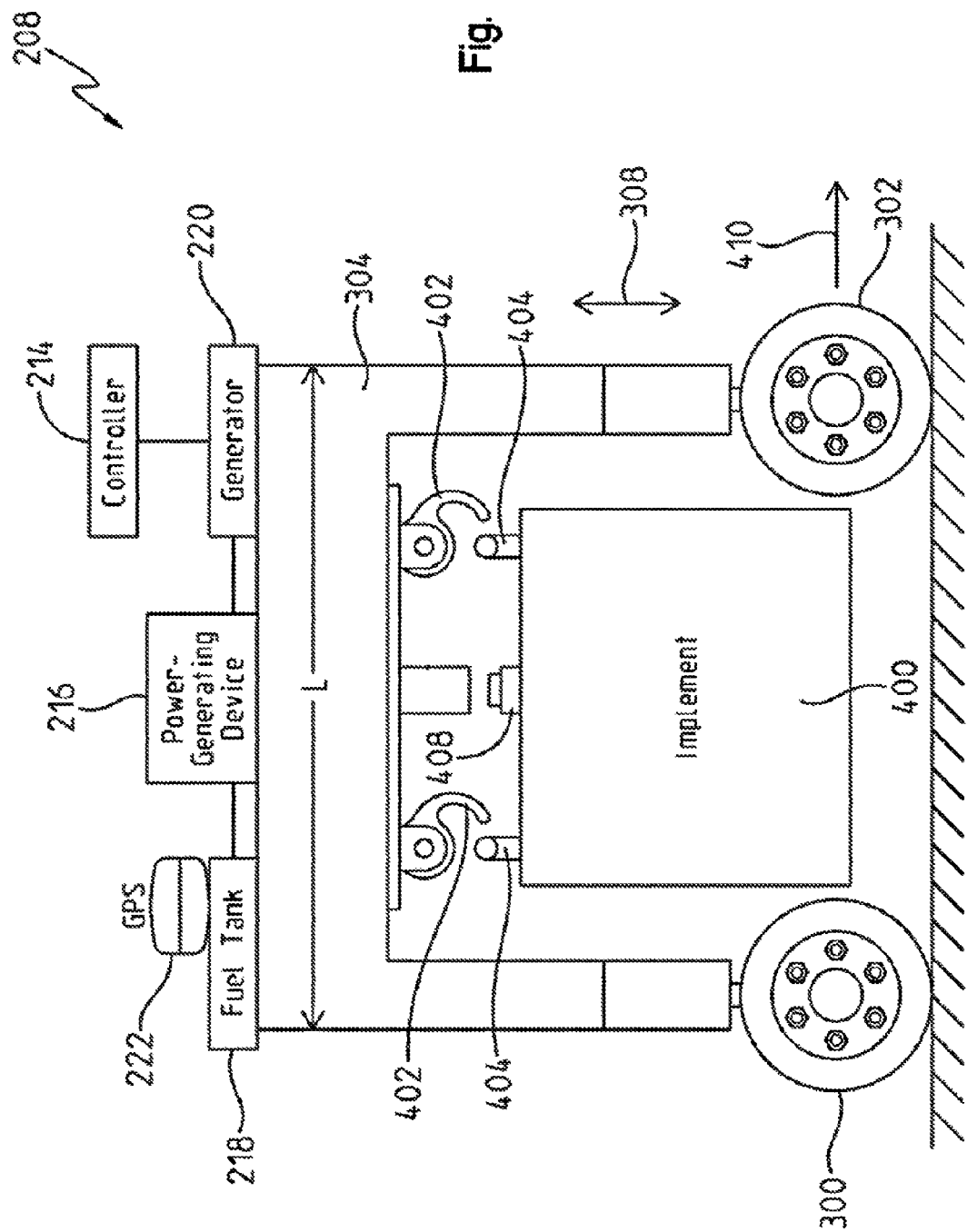
FIG. 4 is a side view of the machine of FIG. 3 illustrating implement docking.

In FIG. 4, a tool or implement 400 is shown being docked or coupled to the work machine 208. Each tool or implement 400 that is capable of being operably docked or coupled to the docking assembly 232 of the machine 208 may include one or more connections. For instance, in FIG. 4, the implement 400 is shown having a first coupling mechanism 404 and a second coupling mechanism 408. The first coupling mechanism 404 may allow for a mechanical coupling between the docking assembly 232 of the machine 208 and the implement 400. There may be one or more first coupling mechanisms 404 on the implement depending upon the size of the implement. The second coupling mechanism 408 may allow for any electrical, hydraulic, or fluid coupling between the implement 400 and the machine 208. The second coupling mechanism 408 may include wires (not shown), piping or tubing (not shown), or other fluid lines. Depending on the implement 400, there may be one or more second coupling mechanisms 408.

When docking to an implement 400, the machine 208 may be controlled in a direction of travel 410 to a position or location where the docking assembly 232 is disposed above the appropriate implement 400. The controller 214 can actuate the height-adjusting actuators 318, 320 to an appropriate height for docking or coupling the implement 400 to the docking assembly 232. The docking assembly 232 may include an implement docking coupler 402. The docking coupler 402 may take the form of a lock, latch, or other known mechanical device for coupling to the implement. In one embodiment, the docking coupler 402 may be electrically controlled by the controller 214 to rotate until it engages with the first coupling mechanism 404 of the implement 400. The first coupling mechanism 404 may define an opening or hole for receiving the implement docking coupler 402. Other known, secure means for coupling the coupler 402 and mechanism 404 may be used. In the event the implement docking couplers are controllably rotated, once the coupler 402 engages the first coupling mechanism 404, additional rotation of the coupler 402 may begin to lift the implement 400 until it is properly aligned. Proper alignment may be necessary to establish secure connections between electrical, hydraulic, and fluid lines between the machine 208 and the implement 400. Moreover, the frame height may be increased to further raise or lift the implement 400 away from a ground surface, which may be necessary in a transport mode.

Other docking systems may be used besides the one described herein. For example, one embodiment may incorporate a snap-fit connection between the implement and machine. In any event, the manner in which the implement is docked or coupled to the machine may be the same for any number of implements capable of performing a harvesting operation, a planting operation, a spraying operation, a tillage operation, or any other agricultural operation. Thus, the docking or coupling is universal between the machine and a plurality of different tools or implements.

As shown in FIG. 4, the machine 208 is movable in a direction of travel 410. As shown, the frame 304 of the machine 208 includes a length, L. In at least one embodiment, the length of the frame 304 may be fixed, i.e., it is not adjustable. In these embodiments therefore the frame height and width are adjustable but the length is fixed. In other embodiments, however, the length of the frame may be adjustable depending upon need. If the frame length is adjustable, a sensor and actuator may be used for detecting and adjusting, respectively, the length of the frame 304.

Although not shown in the previous embodiments, the machine 208 may utilize a portion above the frame 304 for various power elements. For example, a solar panel (not shown) may be mounted to the top of the machine 208. Solar power received by the solar panel may assist with powering various functions of the machine. Likewise, the generator may receive power from the solar panel to further power the wheel motors, the controller, sensors, etc. A battery pack (not shown) may be disposed on top of the frame 304, with an easily accessible terminal to allow the battery pack to be recharged when the machine is not being operated. Other electrical or power elements may be disposed above the frame, or at a location above or outside of the implement area 322.

Figure 5:
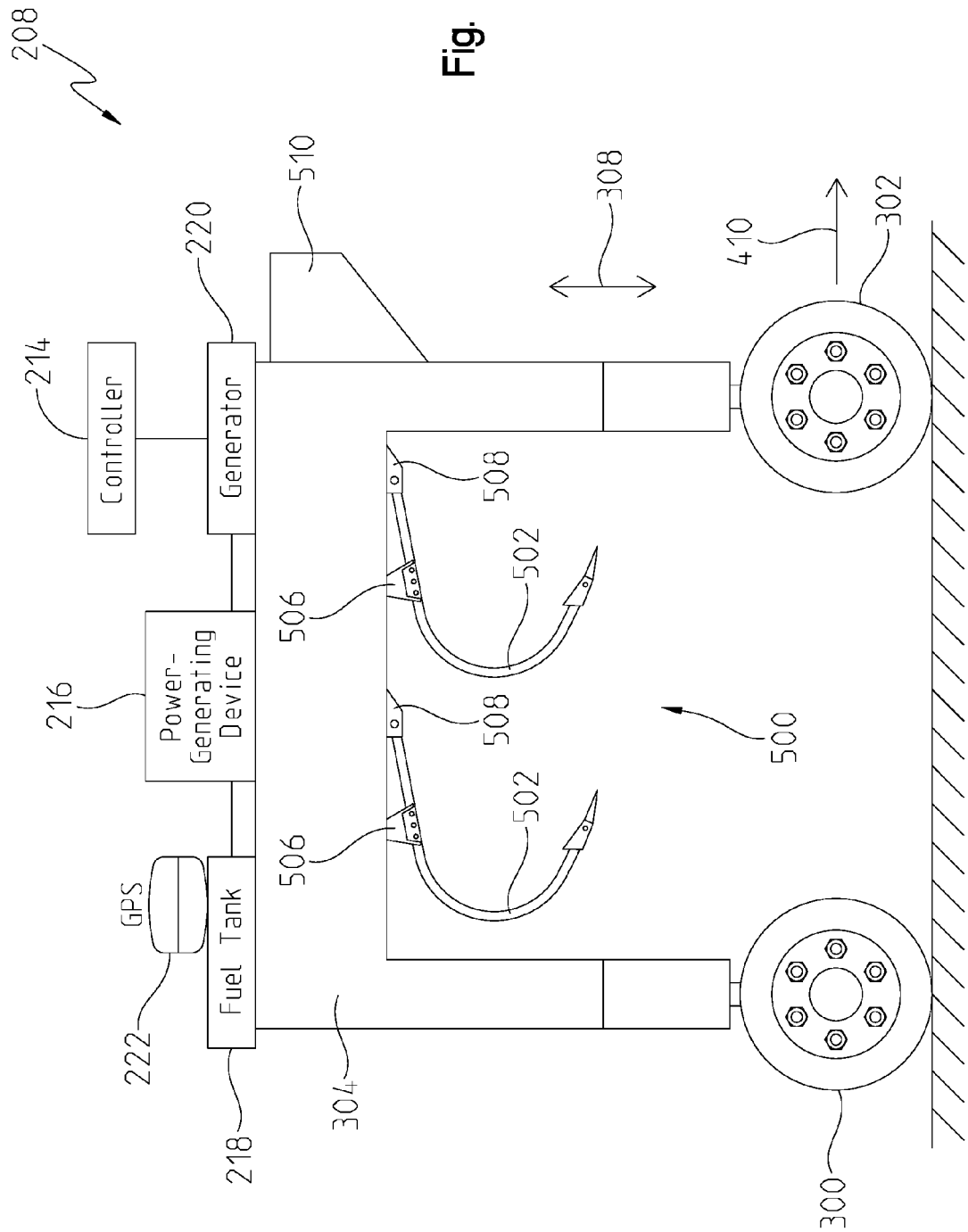
FIG. 5 is a side view of the machine of FIG. 3 with a primary tillage implement coupled thereto.

Referring to FIG. 5, the autonomous robotic work machine 208 is shown with a primary tillage implement 500 being docked or coupled thereto. The primary tillage implement may include one or more rippers 502 docked to the docking assembly 232 of the machine 208. Each ripper 502 may include a first coupling point 506 and a second coupling point. Each coupling point may refer to the first coupling mechanism 404 as shown in FIG. 4. Although not shown, the primary tillage implement 500 may include a second coupling mechanism 408 for incorporating any electrical, hydraulic, or fluid connections with the machine 208.

During a tillage operation, each ripper 502 may be lowered to a desired depth into the ground. To do so, the frame height, H, may be adjusted by the controller 214 to achieve the desired depth. Position sensors or other sensing devices may be incorporated on the machine 208 or tillage implement 500 to communicate the depth of each ripper 502 to the controller 214. Other known means may be used for determining the appropriate depth of the rippers 502 during a tillage operation. Moreover, as the implement 500 is lowered to a certain depth, high draft loads may be experienced. By reducing the frame height, the machine 208 may be better able to handle any loads induced on the implement 500 or machine 208.

In FIG. 5, the machine 208 is shown having a visual detection device such as a camera 510. The camera 510 may communicate with the controller 214 and identify any obstacles in a direction of travel 410 of the machine 208. The camera 510 may further be in wireless communication with the control unit 202 or command center 206 so that images may be viewed in real-time by a farmer or other user. For example, a mobile application on a smartphone or smartwatch may allow a user to continuously monitor the operation of the machine 208. In another example, the camera 510 may provide quality analysis to a user. For instance, crops, weeds, and surface grade may be detected and communicated to the controller 214 during operation. Quality control may be improved via one or more visual detection tools disposed at various locations on the machine 208. While FIG. 5 illustrates a single camera disposed at a front end of the machine 208, the present disclosure contemplates any number of cameras or sensors disposed at any location on the machine.

Figure 6:
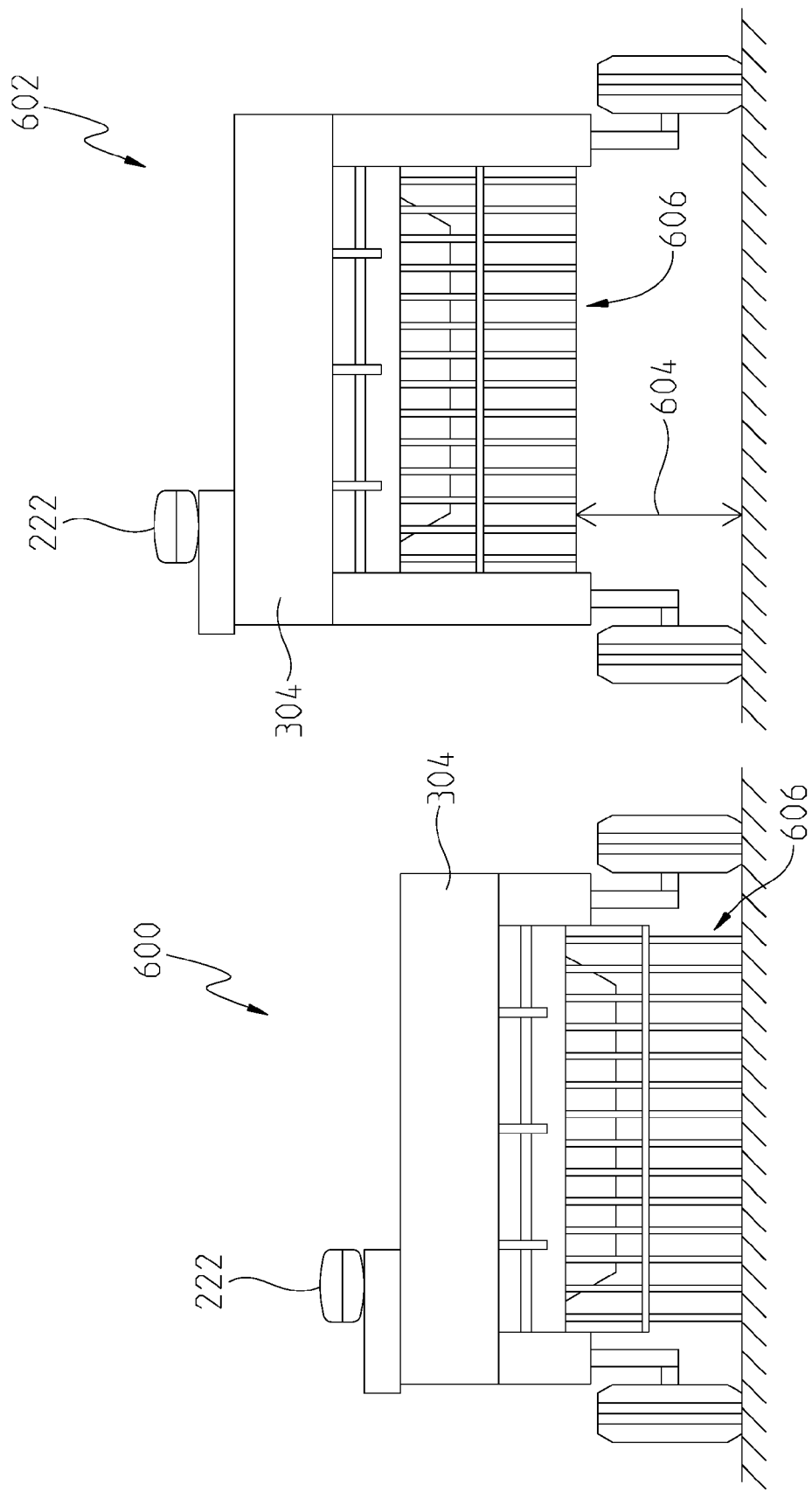
FIG. 6A is a front view of the machine of FIG. 3 with a secondary tillage implement coupled thereto in its lowered position.
FIG. 6B is a front view of the machine of FIG. 3 with a secondary tillage implement coupled thereto in its raised position.

In FIGS. 6A and 6B, a secondary tillage implement 606 is docked or coupled to the machine 208. In FIG. 6A, the machine 208 is shown being in a work position 600. Here, the frame 304 is lowered to enable the implement 606 to engage the soil and perform a tillage operation. In FIG. 6B, however, the machine 208 is shown being in a transport position 602. Here, the frame 304 is raised so that the implement 606 is no longer in contact with the ground. As shown, a space defining ground clearance 604 is established between the implement 606 and the ground. In the transport position 602, the machine 208 may travel at faster speeds than in a working position 600. Alternatively, the machine 208 may travel at the same speed in both positions, but in the transport position the machine 208 is not performing any tillage.

Figure 7:
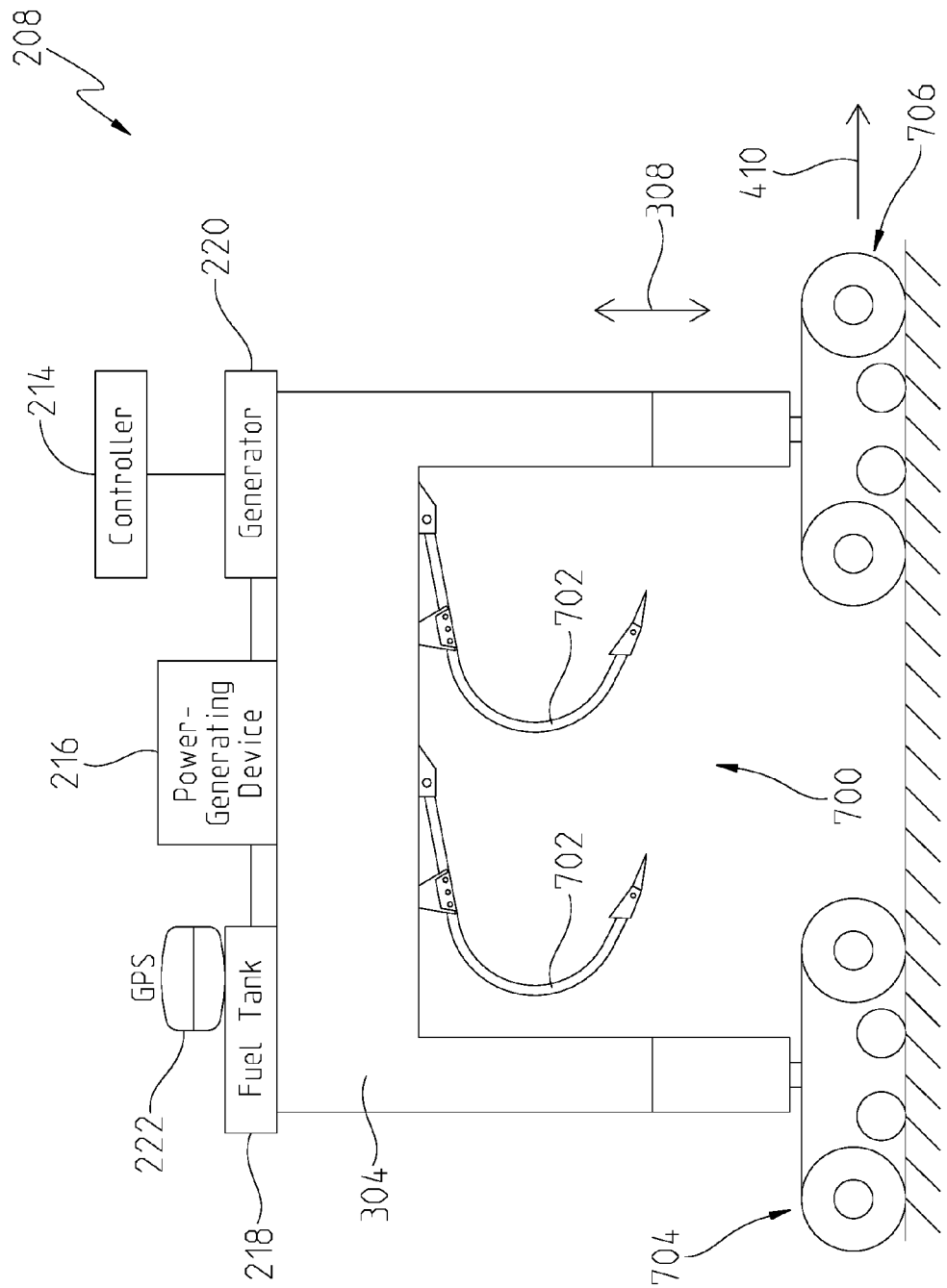
FIG. 7 is a side view of the machine of FIG. 3 with a field cultivating implement coupled thereto.

Referring to FIG. 7, a field cultivating or tillage implement 700 is shown docked or coupled to the machine 208 in a manner similar to that of FIG. 5. The implement 700 includes at least one ripper 702 that is coupled to the docking assembly 232 of the machine 208. In FIG. 7, however, the machine 208 is shown with ground-engaging mechanisms in the form of a first track assembly 704 and a second track assembly 706. As such, the autonomous robotic work machine 208 is contemplated as including either wheels or tracks.

Figure 8:
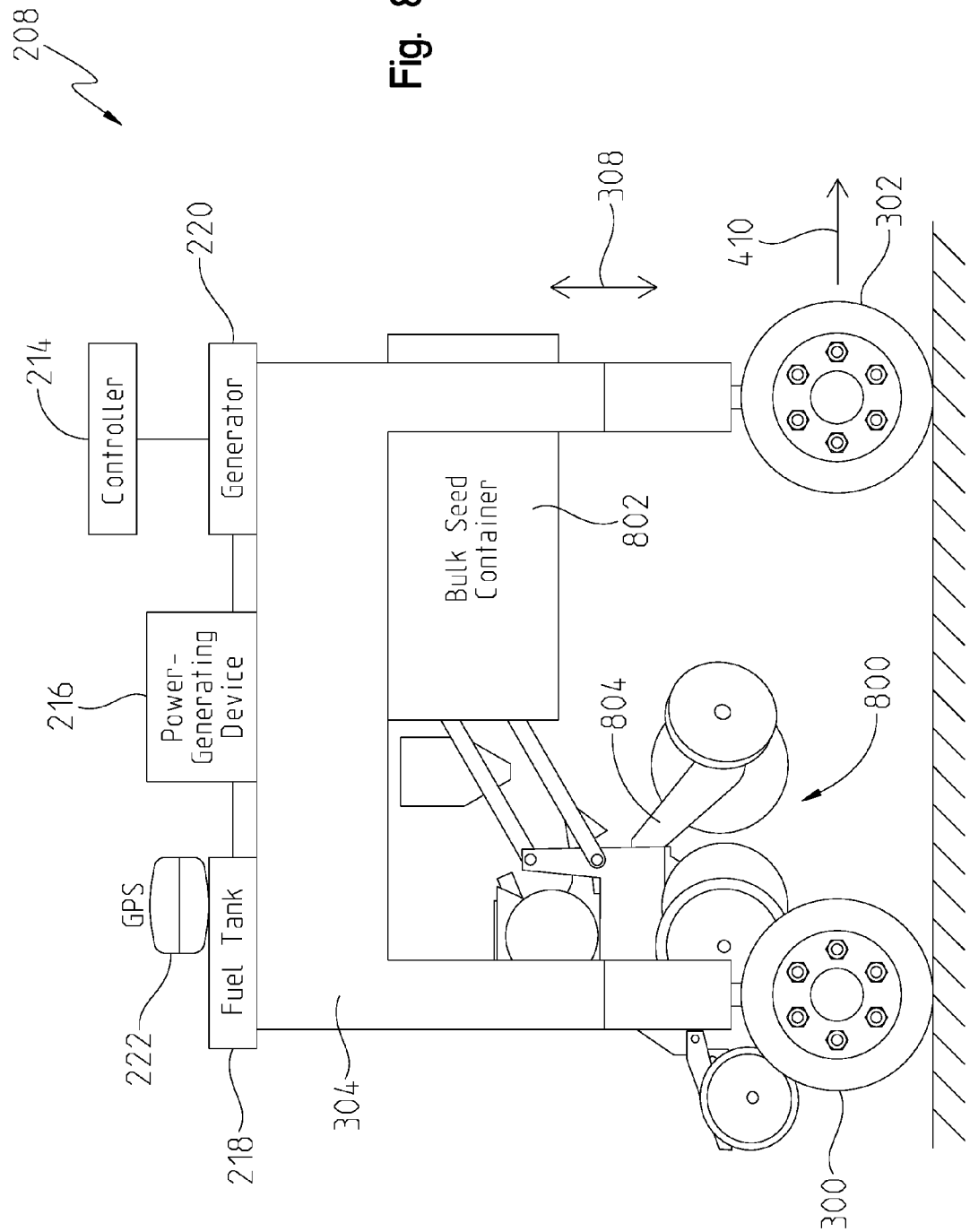
FIG. 8 is a side view of the machine of FIG. 3 with a planting implement coupled thereto.

In FIG. 8, a planting implement 800 is shown being docked or coupled to the machine 208. Here, the planting implement 800 may include a seed container 802 for storing any type of seed. In addition, a planter tool 804 may receive the seed from the container 802 in a conventional manner and plant the seed. In FIG. 8, the machine is shown in a transport mode where the frame is raised so that the planting implement is off the ground. The controller 214 can control the frame height between its transport position of FIG. 8 and its working position (not shown) to perform a planting operation. When docking the planting implement 800 to the machine 208, the planting implement may be located in the tool area as previously described. The machine 208 can be positioned such that the frame straddles or is at least partially disposed over the planting implement 800. The planting implement 800 may be docked or coupled to the docking assembly 232 in a manner as described herein.

Figure 9:
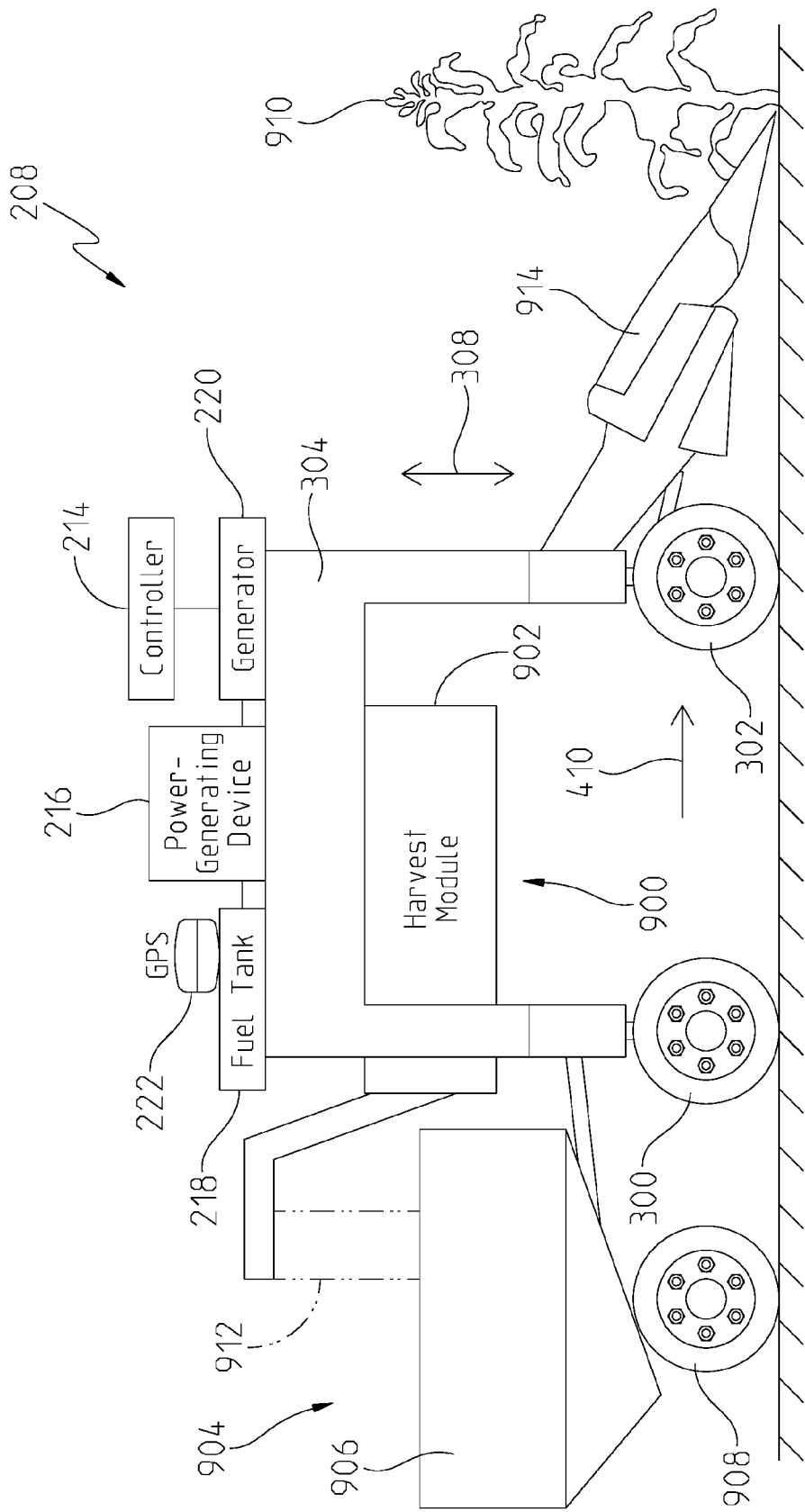
FIG. 9 is a side view of the machine of FIG. 3 with a harvesting implement coupled thereto.

Referring to FIG. 9, a harvesting implement 900 may be docked or coupled to the work machine 208 to complete a harvesting operation. The harvesting implement 900 may include a harvesting module 902 and harvest tool 914 for husking and shelling a crop 910. The harvest module 902 can be docked or coupled to the docking assembly 232 of the machine 208 according to methods as described herein. Grain 912 can be transferred from the harvest module 902 to a crop storage cart 904. The crop storage cart 904 may include a storage container 906 that includes one or more wheels 908. The crop storage cart 904 may be coupled to either the harvest module 904 or the machine 208. In some instances, the crop storage cart 904 may be coupled to both the module 904 and machine 208.

The husking and shelling operation may be achieved by the harvesting tool 914, and the grain stored in the container 906 of the storage cart 904. The container 906 may include a tank with solar fans (not shown) mounted thereto to allow for long-term storage in a field or work area. As such, the container 906 can function as a modular storage unit similar to a cotton picker round module. Each container 906 may include a global-positioning sensor (not shown) that communicates with the machine controller 214, control unit 202 or command center 206. Alternatively, the GPS 222 on the work machine 208 may record a position of the container 906 when the container 906 is left in a work area or field, and the GPS 222 can communicate the location of the container 906 to the machine controller 214, control unit 202, or command center 206. As a result, the container 906 may be located on a field or work area and picked up at a later time. The container 906 may include openings to allow a fork lift to lift it into a pickup truck, for example. Alternatively, it may include means that allows it to be dumped into a semi-trailer or other vehicle. Each container 906 may be designed so that multiple containers 906 can be stacked on top of one another for storage or transport.

Figure 10:
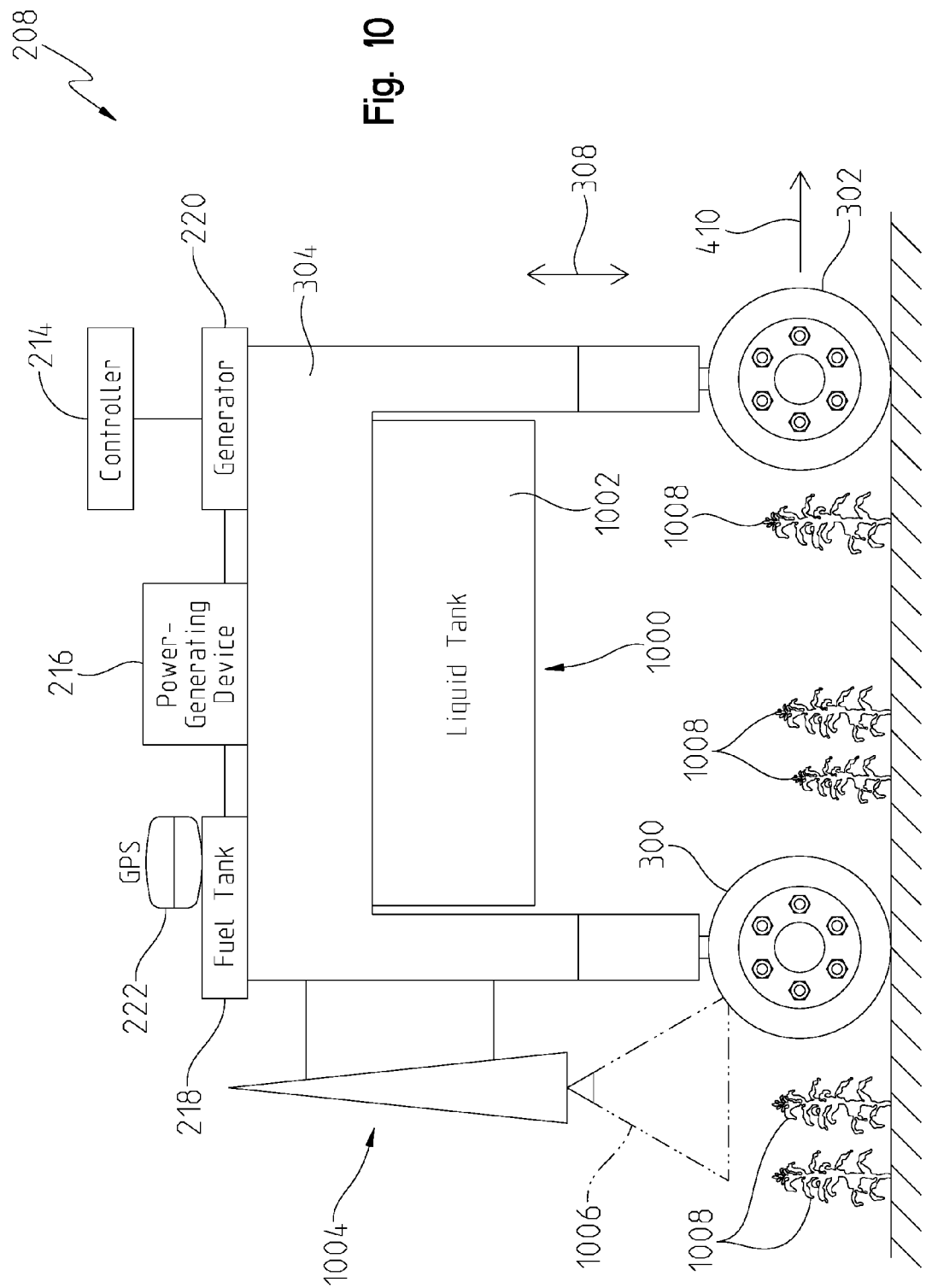
FIG. 10 is a side view of the machine of FIG. 3 with a spraying implement coupled thereto.
Figure 11:
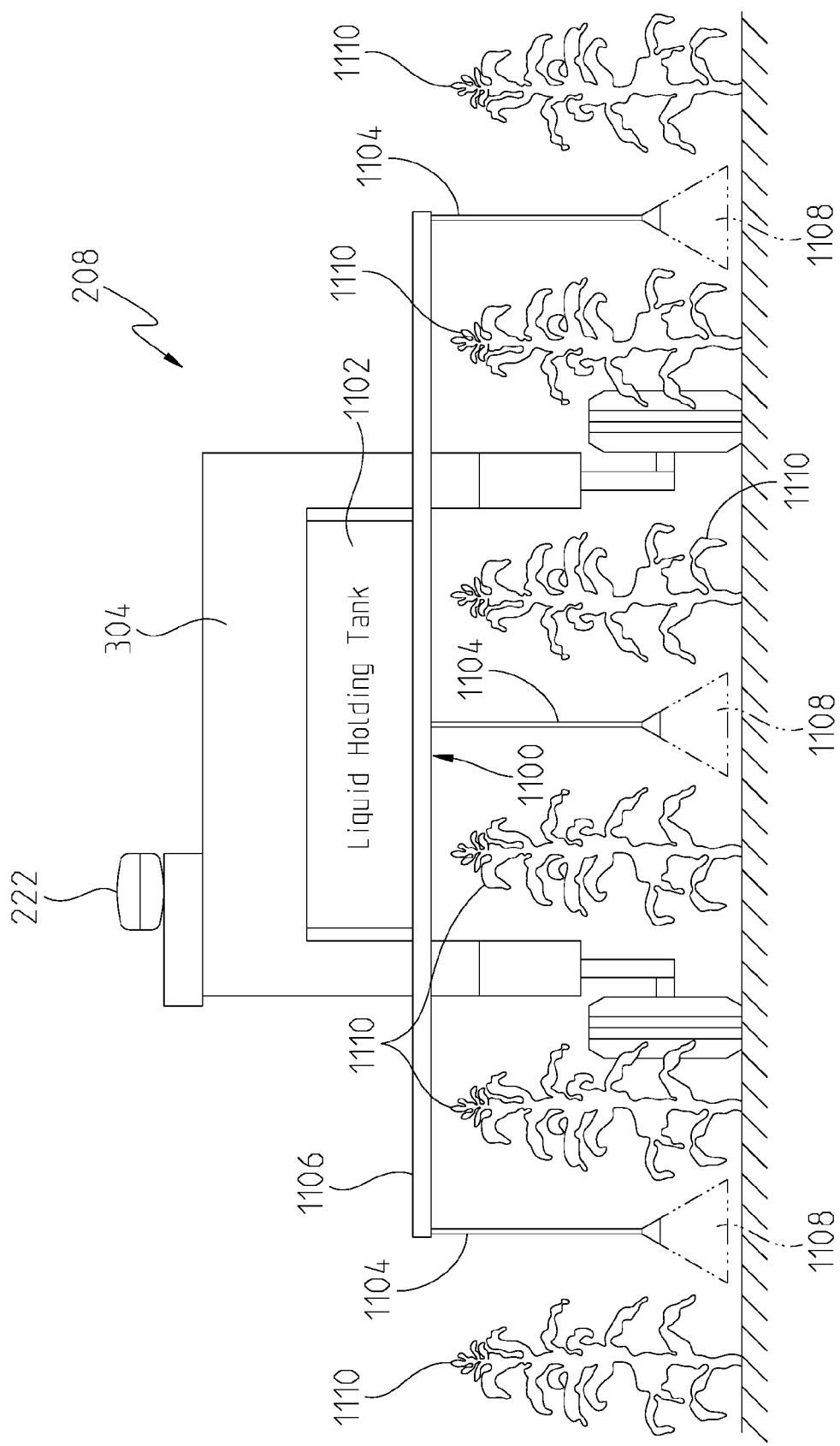
FIG. 11 is a side view of the machine of FIG. 3 with another spraying implement coupled thereto.

In FIGS. 10 and 11, the work machine 208 is shown for performing different spraying operations. In FIG. 10, for example, a spraying implement 1000 is shown docked or coupled to the docking assembly 232 of the work machine 208. The spraying implement 1000 may include a fluid holding tank 1002. In this disclosure, it is contemplated that the fluid holding tank 1002 may hold water or chemical applicant. In one embodiment, one or more chemical products may be coupled to the spraying implement such that the product is in fluid communication with the tank. In another embodiment, the tank 1002 may hold a gas or mixture of a liquid-gas substance. In a further embodiment, the chemical applicant may be a pesticide or fertilizer. Other substances or chemicals may be used as well.

In addition to a tank 1002, the spraying implement 1000 may include a boom 1004 with one or more nozzles (not shown). Each nozzle may be supplied a chemical substance for spraying the substance 1006 on a crop or weed 1008. The machine controller 214 can control the alignment and positioning of the spray implement 1000 such that each nozzle is properly aligned for the spraying operation.

In FIG. 10, the frame 304 is in a lowered position compared to that of FIG. 11. In FIG. 11, the frame is raised to allow for side dress or spraying of taller crops 1110. In this illustrated embodiment, the machine 208 may be performing a spraying operation where nitrogen or other enriching nutrients is being sprayed towards the root mass and at the side of each crop 1110. Here, a spraying implement 1110 similar to that of FIG. 10 may include a tank 1102 for holding a liquid or gas. For example, water may be stored in the tank 1102. The implement 1100 may further include an elongated spray boom 1106. A plurality of nozzles 1104 protrude downwardly from the boom 1106 and produce a spray 1108, as shown in FIG. 11. This setup may be desirable for adding nutrients to late season corn, for example.

The nozzles 1104 may be appropriately spaced from one another such that each nozzle 1104 is aligned between a row of crop. The height adjustability of the machine frame 304 allows the machine 208 to be disposed in its working position to perform any number of operations for different crops and crop sizes. The height and width adjustability further allows the machine flexibility to autonomously perform one operation and then another operation without interruption (except for the time to switch implements and replenish fuel, water, etc.). The machine 208 is not affected by labor stoppage unless it is instructed from the control unit 202 or command center 206 to discontinue a certain operation.

Figure 12:
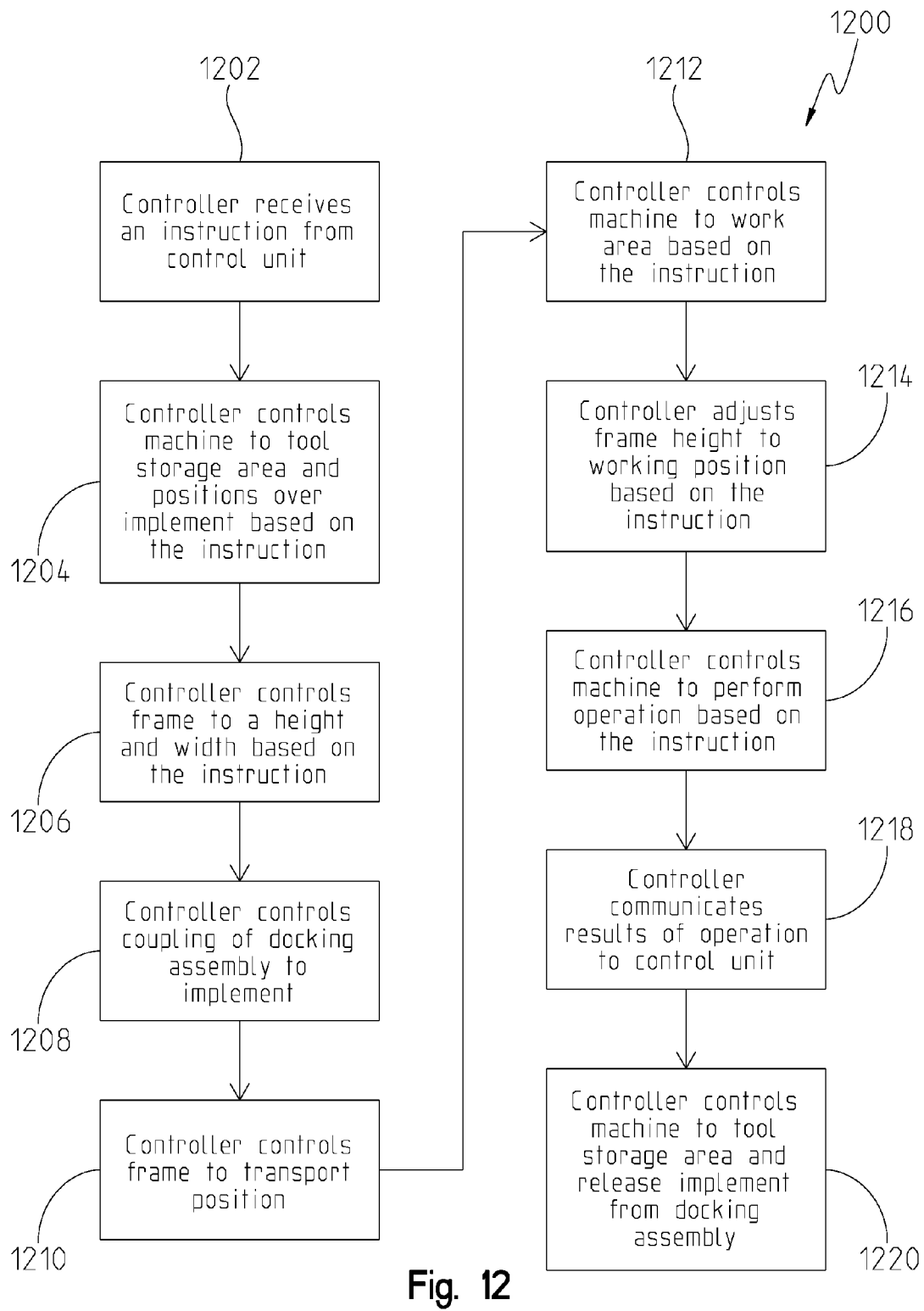
FIG. 12 is a flow diagram of a control process for controlling the machine of FIG. 3 to complete an operation.

Referring now to FIG. 12, one embodiment of a control process 1200 is illustrated for the control of the machine 208. The control process 1200 may include one or more blocks or steps for performing a given task or operation. As previously described, a farmer or owner of the machine 208 may load different tasks or operations into an application that is stored by the control unit 202 or command center 206. This may be achieved via a mobile application, for example, or computer program. The farmer or user may load various information related to a certain operation such as seed type, tillage depth, field type, area, speed, chemical type, etc. As such, when the farmer or user wants a certain operation completed, this may be communicated by the control unit 202 or command center 206 to the machine controller 214 in a first block 1202 of FIG. 12.

In block 1202, the instructions received by the controller 1202 may include a type of operation to be completed. For a tillage operation, the instructions may include field or work area (with associated boundaries and location), type of tillage, and depth prescription. Other information may be provided as well. For a planting operation, the information may include, but is not limited to, field location, seed type, and rate of operation. For a harvesting operation, the information may include field location and crop type. In the event the machine 208 needs to locate a crop storage cart 904, the information may include a location of a cart. For a spraying operation, the information received in block 1202 may include field location, chemical type, and spraying rate.

Once the information is received in block 1202, the control process 1200 can advance to block 1204 where the controller 214 can operably control the machine 208 to a tool storage area where one or more implements are located. Each implement may be located in a specific location known by the controller. Alternatively, an RFID tag or other communication device (e.g., sensor) may transmit a signal to a receiver on the machine 208 so that the controller 214 can correctly identify the type of implement identified in the instructions. Once the correct implement is identified, the controller 214 can control movement of the machine 208 so that the machine is properly aligned with the implement.

Position sensors may detect the proximity and location of the first coupling mechanism 404 and second coupling mechanism 408 on the implement 400. Once alignment is identified, the controller 214 may adjust frame height and width in block 1206 for docking its docking assembly 232 to the implement 400. Sensors or other known detection means can communicate to the controller 214 once the docking assembly 232 is securely docked or coupled with the implement 400. The controller 214 can control any electromagnetic, electrical, hydraulic, or mechanical coupling in block 1208 between the docking assembly 232 and the implement 400.

Once the implement 400 is correctly docked with the machine 208, the control process 1200 can advance to block 1210. Here, the controller 214 adjusts the height and width of the frame 304 so that the machine is in its transport mode or position. Once the machine is in its transport position, the control process 1200 advances to block 1212.

In block 1212, the controller can control movement of the machine 208 to a work area assigned within the instructions received in block 1202. The GPS 222 on the machine can communicate machine movement and location to the controller 214, control unit 202 or command center 206. In any event, the controller 214 can control the machine 208 to its correct work area based on communication with the control unit 202 or command center 206. The work area identified within the instructions may include a field location or an area within a field. For instance, if more than one crop is planted in a single field, the instructions may identify where in the field the machine 208 is to travel. A map of the field may be stored by the control unit 202 or command center 206 to communicate guidance instructions to the machine controller 214. In one embodiment, the machine controller 214 may also store the map within its memory and use the map along with communications from the GPS 222 to guide its travel to the correct location.

Once the machine 208 reaches the correct work area in block 1212, the control process 1200 can advance to block 1214. In block 1214, the controller 214 can adjust the height and width of the frame 304 to its working position. As part of block 1214, the controller 214 may adjust the height and width based on operating instructions received in block 1202. For example, if the instructions received in block 1202 are for a tillage operation, then the controller 214 may adjust the height and width of the frame 304 to accommodate instructions related to a type of tillage and depth prescription. As the tillage tool is lowered and into the ground at the prescribed depth, sensors may communicate with the controller 214 to assure the proper depth is achieved. The tillage tool may include a sensor that communicates with the controller 214, or sensors on the machine 208 may provide height measurements to the controller 214 which can be interpreted based on the relationship between the depth of the tillage tool relative to the frame height. In one embodiment, a look-up table may be stored in the memory of the controller 214 which provides information related to depth prescription of the tillage tool relative to frame height.

For a planting operation, the controller 214 can control the planter tool 804 so that it is properly lowered into the ground to a correct depth. For a spraying operation, the instructions received in block 1202 may specify a height at which the boom is positioned in the working position. Moreover, in block 1214, the controller 214 can control the sprayer boom to unfold from its folding position (if applicable) so that the sprayer implement is ready for the spraying operation.

Once the controller 214 has adjusted the frame height and width and the machine and implement are in their working positions, the control process 1200 can advance to block 1216. In block 1216, the controller 214 can control the machine and implement to perform the desired operation specified in the instructions in block 1202. Depending upon the operation, the instructions received in block 1202 may specify certain requirements that the controller 214 uses for controlling the machine 208 to complete the operation. For instance, if a tillage operation is being performed, the controller 214 may continuously or at least periodically monitor the depth of the rippers 502 to ensure the soil is being tilled at the appropriate depth. If a planting operation is performed, the instructions may include information such as seed type and rate. Here, the controller 214 monitors the rate via sensors and other known detection means. The controller 214 can make adjustments to the machine or implement in real-time so that the instructions are followed. Moreover, as the seed container 802 becomes low or empty of seed, the controller 214 can detect the level of seed and control the machine 208 to a seed loading station for refilling the container. The machine 208 can return to the loading station as often as necessary until the planting operation is completed.

In the event the operation is a harvesting operation, the controller 214 can maneuver the machine 208 to couple with a crop storage cart 904. During operation, the controller 214 can detect when the cart is filled with crop. When filled to a threshold level, the controller 214 can control the machine 208 to travel to a designated location for releasing the storage container 906 full of crop for later pickup. In addition, the machine 208 can be controlled to another location to pick up an empty storage container 906 or a new crop storage cart 904. Additional storage carts 904 or container 906 can be retrieved as necessary until the harvesting operation is completed.

For a spraying operation, the controller 214 can control the machine 208 to perform the spraying operation. In the event water or the chemical applicant becomes low, the controller 214 may detect this via a fluid level sensor (not shown). In turn, the controller 214 can control the machine 208 to refill with water or chemical applicant as necessary. This may repeat itself until the spraying operation is completed. The machine 208 may also include various sensors for detecting wind speed and wind direction. These sensors can communicate measured data to the controller 214 to enable the controller to adjust frame height or width, speed, or the spraying implement to compensate for different wind characteristics. As a result, better quality can be achieved during the spraying operation.

During or after an operation, the controller 214 may provide feedback or results of the operation to the control unit 202 or command center 206 during block 1218. These results may be in the form of quality results, for example. Moreover, the feedback may include a location of the machine relative to the work area assigned in the instructions. This allows the control unit 202 or command center 206 to monitor progress of the operation. It may also allow the control unit 202 or command center 206 to diagnose potential issues or problems with the machine 208, implement 400, or both. These issues may include quality issues with the operation. If the machine 208 is unable to reach a desired speed, the machine 208 may need to be repaired. Other diagnosis may include monitoring fuel levels, oil levels, temperatures, and the like of the machine 208.

In addition to the feedback and results that may be communicated in block 1218, it may also be possible for two or more of the autonomous robotic work machines 208 to be operating in the same field and performing the same operation. A farmer may desire to utilize additional machines 208 to increase productivity and efficiency. As a result, the controller 214 in block 1218 may communicate with the control unit 202 or command center 206 about the progress made by other machines in the same work area. This may include the location of other machines in the same work area relative to the controller 214, and any adjustments made to the original instructions received in block 1202. Other communications may be transmitted or received by the controller 214 in block 1218 for completing the operation.

Once the operation is completed, the control process 1200 can advance from block 1218 to block 1220. In block 1220, the controller 214 can communicate with the control unit 202 or command center 206 that an operation is completed and request any further instructions therefrom. In one example, the instructions may be to return the implement 400 to the tool storage area. For a tillage operation, this may include the controller 214 controlling the machine 208 from the field or work area to the tool storage area and releases the tillage implement from the docking assembly 232. For a planting operation, the controller 214 may control the machine 208 to return any unused seed from its seed container 802. Once the seed is returned, the planter implement 800 may be returned to the tool storage area and released from the docking assembly 232.

For a harvesting operation, the controller 214 can control the return of the storage container 906 to its designated area. Moreover, the crop storage cart 904 may be returned to its appropriate location, and the harvesting implement 900 including the harvesting module and harvest tool 914 may be returned to the tool storage area. Here, the controller 214 can control the release of the harvesting implement 900 from the docking assembly 232.

With regards to a spraying operation, the controller 214 may control the sprayer boom 10004, 1106 from its unfolded position to its folded position. As with the other embodiments, the frame 304 may be adjusted from its working position to its transport position, and the spraying implement 1000, 1100 may be returned to the tool storage area. Any hoses or plumbing of the spraying implement may be flushed and cleaned out for future use. The controller 214 can release the spraying implement from the docking assembly 232 at the tool storage area.

Once the implement 400 is released from the machine 208, the controller 214 is ready to receive any further instructions from the control unit 202 or command center 206. Instructions may include to refuel, recharge any battery-powered unit of the machine, or otherwise receive general maintenance thereof. Moreover, instructions may include another agricultural operation to perform. In this case, the control process 1200 may be repeated.

The present disclosure therefore provides an autonomous robotic work machine that is capable of performing any agricultural operation without having a cab or operator's station with an operator onboard. The machine includes its own self-contained power and control system for communicating with remote control units, and the machine can operably dock or couple with any number of tools or implements for performing any agricultural operation. The machine may be a complete robotic farming solution capable of nutrient application, tillage, planting, spraying, late season application, weeding, harvesting, etc. The machine may also provide an alternative to traditional or conventional farming tools used in different global markets, and the machine may include newer technology for improving productivity and efficiency at lower costs. Self-contained environmental sensors may be used to improve performance, and tools and technology that are currently utilized today may be further leveraged with the teachings of the present disclosure. For example, robotic controls, wireless data transfer, guidance, and electric drives may be utilized. Future generation controls such as drift modelling, camera vision tillage quality, and the like may be incorporated in the machine.

Customer mobile devices such as cellular phones, smart phones, smartwatches, etc. may also be utilized with the robotic farming solution as described herein. Other advances in technology may be incorporated such as virtual reality or visual guidance of environmental surroundings during a certain operation may be communicated to a user.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An autonomously robotic machine for performing one or more agricultural operations, comprising:
   a frame having a length and an adjustable width;
   a plurality of ground-engaging mechanisms coupled to the frame for propelling the machine in a direction of travel;
   a controller for autonomously controlling the machine;
   a position sensor coupled to the frame and disposed in electrical communication with the controller, the position sensor detecting a width of the frame; an actuator electrically coupled to the generator and the controller;
   a power unit including a power-generating device and a generator, the power-generating device being mounted to the frame for producing mechanical power and the generator being coupled to the power-generating device to receive at least a portion of the mechanical power and produce electrical power; and
   a docking assembly coupled to the frame, the docking assembly including at least one coupler configured to couple to any of a plurality of agricultural implements;
   wherein, the controller operably controls the actuator for adjusting the frame width in response to a width of an implement selected from the plurality of agricultural implements for coupling to the docking assembly;
   wherein the docking assembly is coupled to the power unit and is configured to power any of the plurality of agricultural implements when coupled to the docking assembly;
   further wherein, the at least one coupler is positioned at least partially beneath the frame and between the ground engaging mechanisms.

2. The machine of claim 1, further comprising:
   a position sensor coupled to the frame and disposed in electrical communication with the controller, the position sensor detecting a height of the frame; and
   an actuator electrically coupled to the generator and the controller;
   wherein, the controller operably controls the actuator for adjusting the height of the frame between a lowered position and a raised position.

3. The machine of claim 1, wherein the power unit comprises a diesel-electric or natural gas-electric unit.

4. The machine of claim 1, further comprising a motor electrically coupled to the generator, wherein the motor receives electrical power from the generator for driving at least one of the plurality of ground-engaging mechanisms.

5. The machine of claim 1, further comprising a sensor disposed in electrical communication with the controller, the sensor configured to provide visual feedback to the controller of an area around or under the frame.

6. The machine of claim 1, further comprising:
a global positioning sensor disposed in electrical communication with the controller; and
a speed sensor disposed in electrical communication with the controller;
wherein, the global positioning sensor is configured to provide a location of the machine and the speed sensor is configured to provide a speed of at least one of the plurality of ground-engaging mechanisms to the controller.

7. The machine of claim 1, wherein an implement-receiving area is defined at least partially below the frame, the implement-receiving area configured to receive one of the plurality of agricultural implements when coupled to the docking assembly Wherein at least a portion of the implement is positioned below the frame and between the plurality of ground engaging mechanisms.

8. The machine of claim 1, wherein the at least one coupler of the docking assembly comprises an implement docking locking mechanism and an electrical or hydraulic connecting mechanism.

9. The machine of claim 1, wherein the docking assembly is operably coupleable to any one of a planting implement, a tillage implement, a harvesting implement, and a spraying implement.

10. An agricultural system for performing an agricultural operation, comprising:
an autonomous robotic machine including a frame, a plurality of ground-engaging mechanisms coupled to the frame, a controller, a power-generating device mounted to the frame for producing mechanical power, a generator coupled to the power-generating device, and a docking assembly coupled to a bottom portion of the frame between the plurality of ground-engaging mechanisms, wherein the docking assembly includes a power unit and at least one coupler;
a control unit located remotely from the machine, the control unit being in electrical communication with the controller to communicate an instruction thereto;
a position sensor coupled to the frame and disposed in electrical communication with the controller, the position sensor detecting a height or width of the frame; an actuator electrically coupled to the generator and the controller;
a docking station for coupling to the docking assembly, the docking station configured to store one or more of fuel, water, and electrical power; and
a plurality of sensors positioned on the machine, wherein each of the plurality of sensors is electrically coupled to the controller;
wherein, the controller operably controls the actuator for adjusting the height or width of the frame in response to a width of an implement selected from the plurality of agricultural implements for coupling to the docking assembly and performing the agricultural operation;
wherein, the controller receives the instruction from the control unit, and the controller operably controls the machine based on the instruction to perform an agricultural operation.

11. The system of claim 10, wherein the control unit comprises a memory unit for storing a map of a work area, a list of agricultural operations, and operating instructions;
further wherein, the control unit communicates a command to the controller to autonomously couple the docking assembly to any of a plurality of agricultural implements, move to a location in the work area, and execute operating instructions to perform the agricultural operation.

12. The system of claim 11, wherein the plurality of agricultural implements comprises a tillage implement, a planting implement, a harvesting implement, or a spraying implement.

13. The system of claim 11, wherein at least one of the plurality of sensors comprises a positioning sensor for detecting when the agricultural implement is coupled to the docking assembly, the positioning sensor communicating with the controller when the docking assembly is coupled to the agricultural implement.

14. A method of controlling an autonomously robotic machine to perform an agricultural operation, comprising:
providing an autonomous robotic machine including a frame, a plurality of ground-engaging mechanisms, a controller, a power-generating device for producing mechanical power, a generator coupled to the power-generating device and producing electrical power, and a docking assembly coupled to the frame between the plurality of ground engaging mechanisms, the docking assembly including a power unit;
receiving an instruction from a control unit located remotely from the machine, the instruction commanding the controller to perform at least one agricultural operation with at least one of a plurality of agricultural implements at a location in a work area, where the instruction identifies the at least one agricultural implement;
executing the instruction to maneuver the machine to an implement storage area so that the docking assembly is in position at least partially above the at least one agricultural implement identified in the instruction;
controlling a width or height of the frame based on the instruction in response to a width or height of the at least one agricultural implement;
coupling the docking assembly to the at least one agricultural implement;
adjusting the height and width of the frame to a transport position;
operably controlling the machine to move to the location in the work area;
adjusting the height and width of the frame to a work position based on the instruction; and
performing the agricultural operation with the at least one agricultural implement in the work area.

15. The method of claim 14, further comprising controlling the at least one agricultural implement to its working position based on the instruction, wherein the instruction includes information related to depth prescription for a tillage operation, seed type and rate for a planting operation, crop type for a harvesting operation, and chemical type and spraying rate for a spraying operation.

16. The method of claim 14, further comprising:
controlling the machine to return the at least one agricultural implement to the implement storage area; and
releasing the at least one agricultural implement from the docking assembly.

17. The method of claim 14, further comprising controlling the power unit to provide electrical power to the at least one agricultural implement to perform the agricultural operation.

18. The method of claim 14, further comprising:
    receiving a second instruction from a position sensor related to the height or width of the machine; and
    controlling an actuator to adjust the height or width of the frame to an appropriate height or width based on the instruction.

* * * * *